INVENTOR.
JACK H. WATSON
BY
Fulwider Mattingly & Huntley
ATTORNEYS.

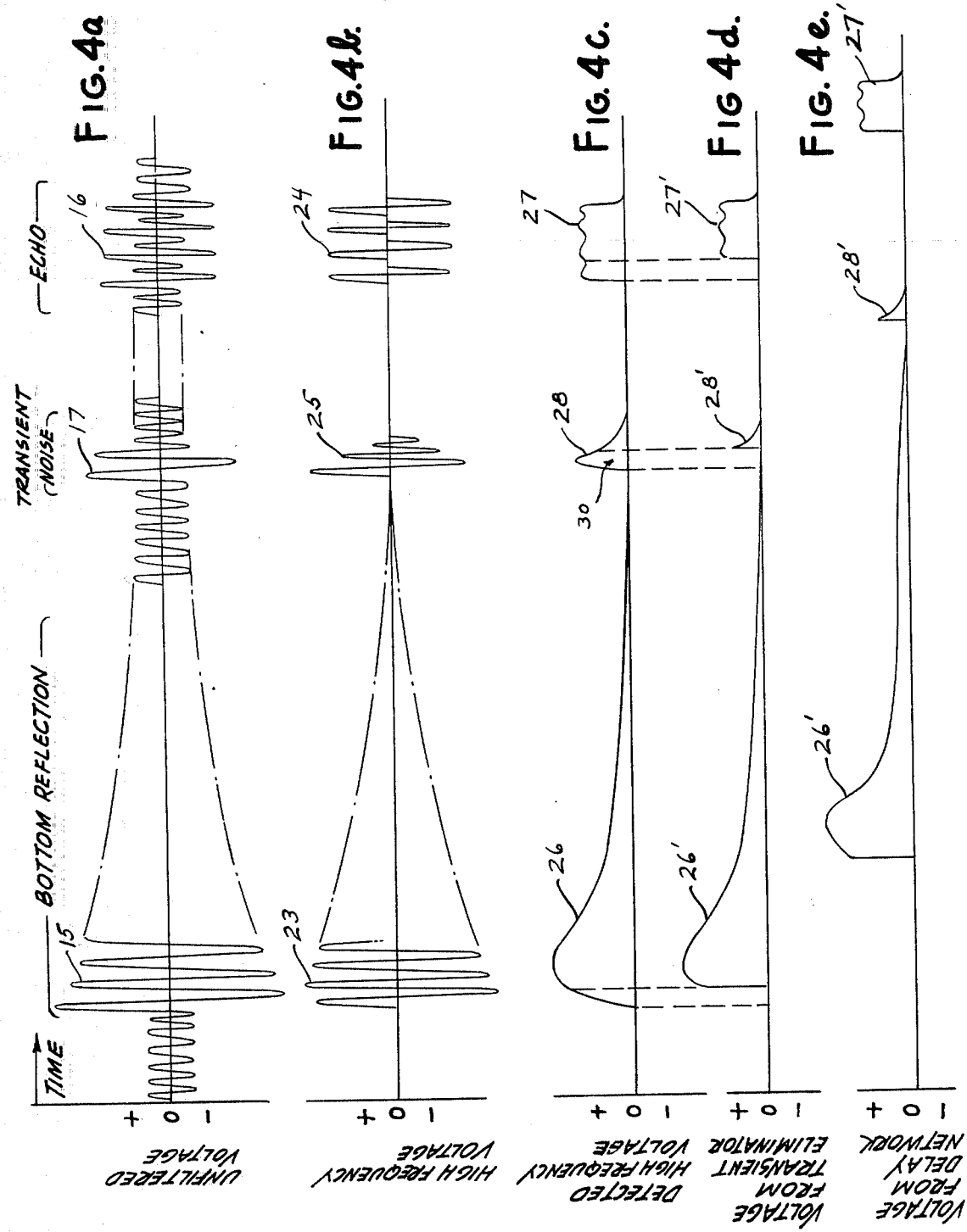

May 12, 1970 J. H. WATSON 3,512,124
SIGNAL ANALYZING AND INDICATING METHOD AND APPARATUS
Filed Feb. 29, 1960 4 Sheets-Sheet 4
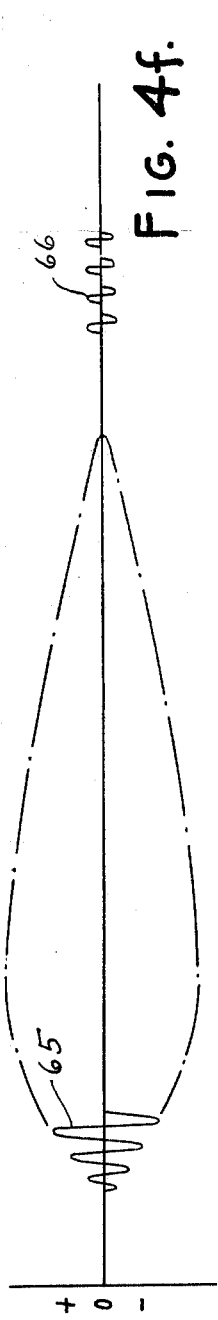
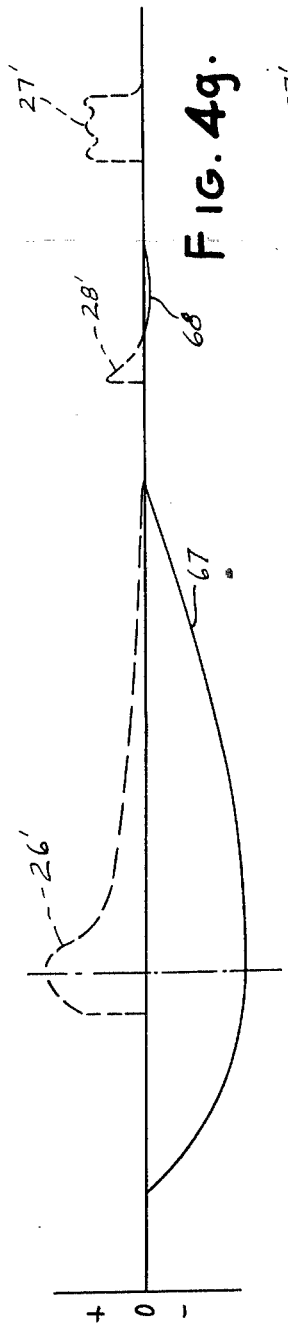
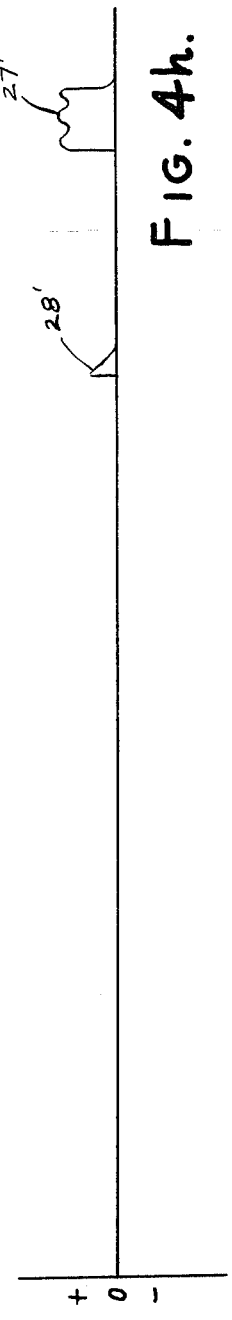
INVENTOR.
JACK H. WATSON
BY
Fulwider Mattingly & Huntley
ATTORNEYS.

United States Patent Office 3,512,124
Patented May 12, 1970

3,512,124
SIGNAL ANALYZING AND INDICATING METHOD AND APPARATUS
Jack H. Watson, Los Angeles, Calif., assignor to McDonnell Douglas Corporation, Santa Monica, Calif., a corporation of Maryland
Filed Feb. 29, 1960, Ser. No. 11,924
Int. Cl. G01s 9/66
U.S. Cl. 340—3          8 Claims

ABSTRACT OF THE DISCLOSURE

A sonar system for detecting relatively small objects and eliminating signals caused by echoes from large reflectors such as the ocean bottom. An explosive charge is used to create a sound wave and received echoes are separated by filtering and then recombined to substantially eliminate the lower frequency signals.

---

This invention relates to signal analysis systems, and more particularly to a unique method and apparatus for locating objects in a medium on the basis of the energy-reflecting characteristics of objects of various sizes and which is suitable, for example, for detecting objects under water to aid in navigating a ship through a harbor.

In the operation of conventional signal analysis systems, the background noise (or ambient noise) and the reflecting characteristics of a variety of objects often-times cause the signals from a desired source to be completely masked. Typical of such a system is the underwater sound detecting system. In both passive and active sound detecting systems, transducer apparatus is submerged in the water. Where the transducer is mounted on a vessel, it is supported on a rotatable shaft extending through the hull. Where it is used at a shore station, the apparatus is customarily submerged in the water, and has a motor drive operable from a shore facility. Turning of the transducer is effected under manual control, as by turning the shaft on a ship, or by manipulating a rheostat which controls the motor drive.

The transducer, which has a diaphragm actuated in response to sound vibrations, generates voltages which are utilized to actuate the diaphragms of headphones. An operator wearing the headphones is on the alert for sounds which are perceptibly different, in terms of time distribution and change in amplitude, than the background noise. The position of the transducer at which he receives the perceptible difference is interpreted by him as the bearing of a target.

Present underwater sound detecting systems are at a serious disadvantage because of their necessary reliance on the human element. For example, in the situation where the sounds arrive at the transducer from a single ship both directly and by reflection off another ship nearby, the operator may report the ship at both bearings. Alternatively, he may report the ship to be on a bearing along which the reflected sounds are received, and fail to detect the true bearing of the ship.

Another difficulty is the onset of auditory fatigue. The operator must constantly strain to hear against a distracting noise background. Further, movement of the object to be detected, as in rolling and pitching of a ship, results in the sound therefrom travelling along different paths so as to appear to be varying in frequency and intenstiy. Auditory fatigue results after a period of attempting to pinpoint the bearing of a sound source under such circumstances, and the operator is unable to determine the presence and bearing of underwater sounds. It is not at all uncommon at this point for an operator to report non-existent targets, and to fail to report targets that are present.

The so-called active system of sound detection is an attempt to remove some of the disadvantages inherent in the passive type system. In the active system, sounds generated by a target are not relied upon to detect its presence. Instead, a transmitter of tone signal pulses of a precise frequency is incorporated in the system. The operator listens for the signal pulses reflected by the target, to thereby detect the presence and bearing of the target.

To make the active system highly selective, it is designed to reject all but pulses of the predetermined frequency. Unfortunately, noise generated by the ship on which the transmitter and receiver are located often masks the reflected pulses, and the resulting low signal-to-noise ratio prevents detection of the target.

It is a primary object of this invention to provide a method and apparatus for signal analysis that overcomes the above and other disadvantages of the prior art.

It is another object of this invention to provide a method and apparatus for locating an object on the basis of its energy-reflecting characteristics, and without reliance upon a human operator.

A further object of this invention is to provide a system for analyzing different frequency components in an energy conveying medium, and automatically analyzing the components and determining the presence of information in one of them.

Another object of this invention is to provide a unique active type underwater detecting system in which a plurality of sound frequencies are purposely generated for obtaining information about the presence and bearing of a target.

The above and other objects and advantages of this invention will become apparent from the following description, taken in conjunction with the accompanying drawings of an illustrative embodiment thereof, in which:

FIG. 4 is a plot of voltage with time, as illustrative of the voltage developed by the transducer of FIG. 1 after an explosion has created a variety of sound frequencies to be reflected from underwater objects, and illustrating the appearance of reflections from the bottom of the ocean, from transient noise, and from a relatively small object such as a submarine;

FIG. 4b is a plot of the high frequency voltage obtained from the high frequency filter of the system of FIG. 1, showing the major portion of the energy of the echo to be at such high frequency;

FIG. 4c is a plot of the wave form of the high frequency voltage of FIG. 4b, following detection;

FIG. 4d is a plot of the voltage from the transient eliminator of FIG. 1, showing how the initial portions of the voltage wave forms representing the bottom reflection, the transient noise, and the echo are eliminated, whereby to eliminate the effects of the noise;

FIG. 4e is a plot of the voltage of FIG. 4b delayed in time;

FIG. 4f is a plot of the low frequency voltage obtained from the low frequency filter of FIG. 1, showing the substantially negligible amount of a low frequency component of the echo in such low frequency range;

Figure 1:
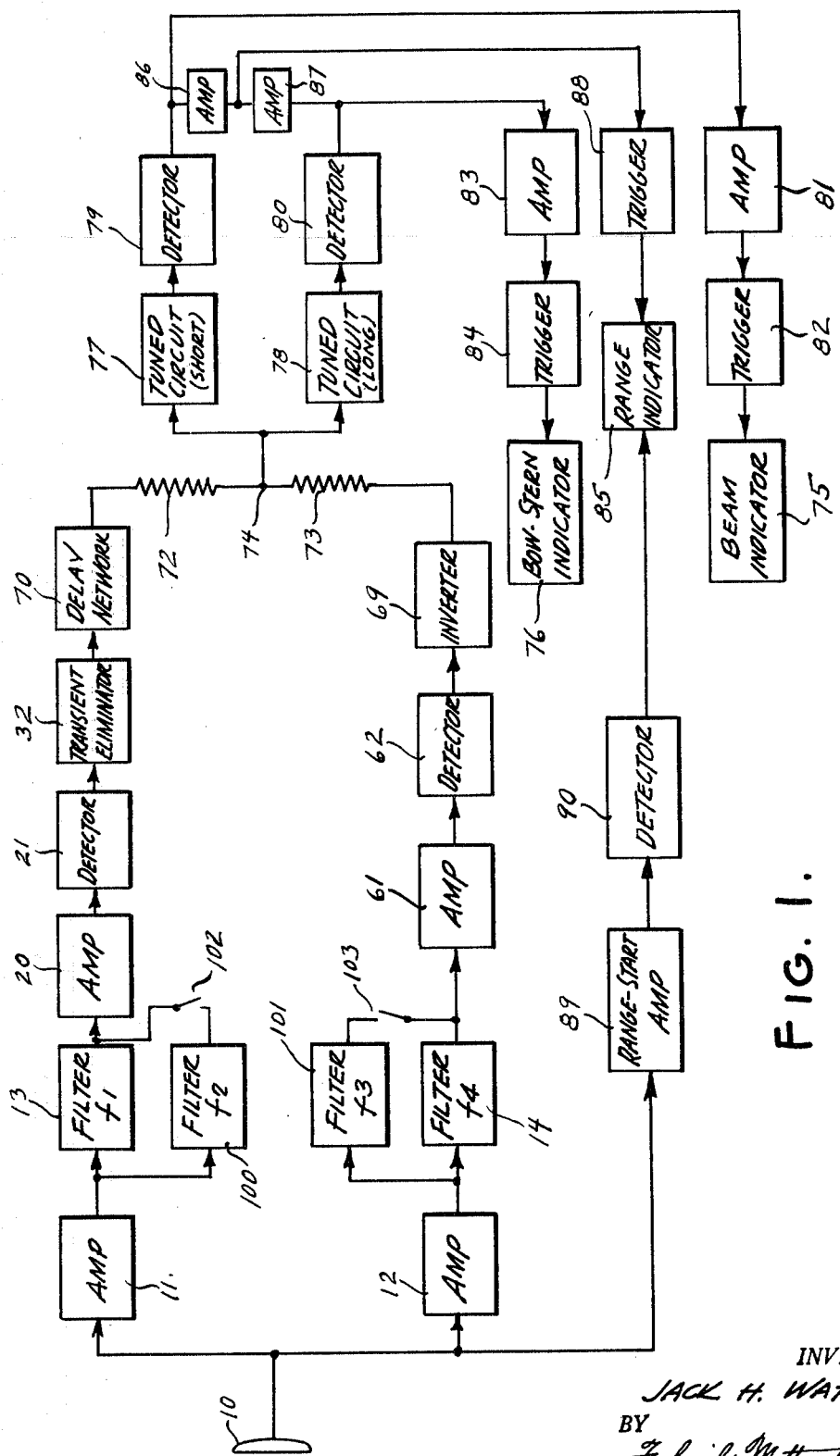
FIG. 1 is a block diagram of an underwater detecting system in which multiple-frequency sounds are generated to be reflected from a variety of undersea objects of different sizes, showing means for processing different frequency components that are identifiable with objects of different size, and extracting information therefrom on the range and attitude of a target.

FIG. 4g is a plot of the detected wave form of the voltage of FIG. 4f, showing the delayed envelope of FIG. 4e superimposed thereon to demonstrate the desired relationships thereof preparatory to subtracting the low frequency envelope from the high frequency envelope; and FIG. 4h is a plot of the voltage obtained upon subtraction and detection of the outputs of the high frequency and low frequency channels, showing the only remaining voltage to be a voltage corresponding to the high frequency echo received from the small object.

Preparatory to describing the system of FIG. 1, an explanation will be made of the fundamental principles involved, and my unique method for locating an object under water.

In my invention, I utilize the phenomenon of reflection characteristics (due to physical properties, as mass and elasticity) of objects of various sizes that are located in the path of a plurality of energy waves of widely differing frequencies. "Size" in this context refers to the totality of parts of an object that are active in reflecting energy in a wave front as it meets and moves past the object. In such a situation, the size of an object determines the frequencies within which the greater portion of the reflected energy therefrom is contained. In this connection, the larger the object, the lower the frequencies that contain the greater portion of the energy reflected, and vice versa. An analysis of objects of different sizes reveals that there is a specific frequency range of reflected energy that is identifiable with each object.

In my invention, I locate an object by first establishing a source of energy having a wide variety of frequency components. Such frequency components travel through the medium toward all objects in the vicinity. For any object I desire to locate, I pick out the frequency of the energy reflected by that object, and the frequency of the energy reflected by an object that is markedly different (e.g., larger) in size. The higher frequency energy is energy reflected from the larger object and also the object it is desired to locate. These signals are combined so that both the high and low frequency components of the energy reflected from the larger object are cancelled, thereby leaving the high frequency component of energy reflected from the desired object, e.g. the echo from a submarine. The echo is utilized to obtain an observable indication of the existence of the object.

In an underwater sound detecting system, my above-described method comprises the steps of simultaneously generating a wide variety of sound frequencies, as by setting off an explosive charge under water, to travel through the water toward all the objects in the vicinity. From a large object, e.g., the bottom, I select two frequency components of reflected energy, one of which is also the component of energy that is reflected from a smaller object, i.e., the echo from the object of predetermined size. These signals are then combined so that the high and low frequency components of the energy reflected from the bottom are cancelled, thereby leaving the high frequency echo.

Figure 3:
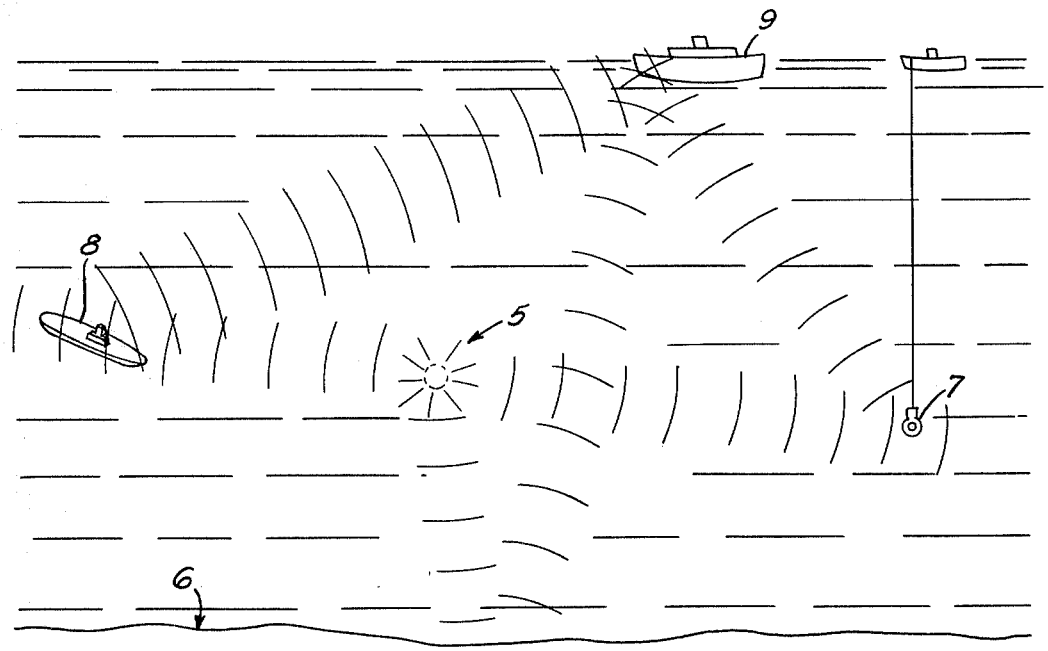
FIG. 3 is a pictorial representation of a section of the sea depicting the reflection of sound waves from different objects in response to sound waves from a multi-frequency source.

In FIG. 3, the explosive charge is indicated at 5, and sound waves emanating therefrom, and striking the bottom 6, a diving bell 7 and a submarine 8, result in sonic energy being reflected from those objects. The reflected energies reach a surface ship 9 in which my detecting system is located.

Referring to FIG. 1, an underwater object detecting system in accordance with my invention employs transducer means 10, such as a hydrophone pickup, to develop voltages in response to the pressure variations on the transducer diaphragm (not shown) created by the sound waves reaching the transducer. As will be apparent, an explosive charge will result in the arrival at the transducer of a main bang of energy followed by reflections of energy from various objects in the vicinity.

The transducer 10 is coupled to amplifiers 11, 12 in respective frequency channels. In this connection, the amplifiers 11, 12 are coupled to respective filters 13, 14 that are adapted to pass signals of different frequencies $f_1$, $f_4$. These frequencies are such that they are both present to a significant degree in reflected waves from the larger object, but the higher frequency $f_1$, is substantially the only significant energy portion of waves reflected from the smaller object.

For example, the larger object may be the ocean bottom, which reflects substantially all sound frequencies impinging thereon, and therefore reflects both of the frequencies $f_1$, $f_4$. The higher frequency $f_1$, however, is the frequency of substantially the major portion of the energy that can be reflected by a small object, e.g., a submarine.

Referring to FIG. 4a, the voltage 15 represents the sound energy reflected from the ocean bottom, and the voltage 16 represents the sound energy reflected from an object of predetermined size. There is also shown a voltage 17 that represents transient noise, i.e., a noise "spike"; as will be explained hereinafter, my invention eliminates such unwanted transients.

An amplifier 20 and detector 21 are coupled to the filter 13 for developing a voltage that varies as the envelope of the high frequency voltage. Referring to FIG. 4b, the voltage waves 23, 24 and 25 represent the high frequency $f_1$, component of the bottom reflection 15, the echo 16 and the transient noise 17. FIG. 4c illustrates the corresponding voltages 26, 27, 28 appearing in the output of the detector 21.

As will become evident, the transient voltage 25 may be of sufficient duration, so that it could be processed as an echo signal, i.e., as a signal representing an object of the size it is desired to locate. In accordance with my invention, the initial portion of the noise transient is eliminated, whereby to leave only an insignificant portion of the noise voltage. This is illustrated in FIGS. 4c and 4d, wherein it is shown that the interval 30 of the voltage 28 is eliminated, so that the remaining voltage 28′ (FIG. 4d) is substantially negligible.

Figure 2:
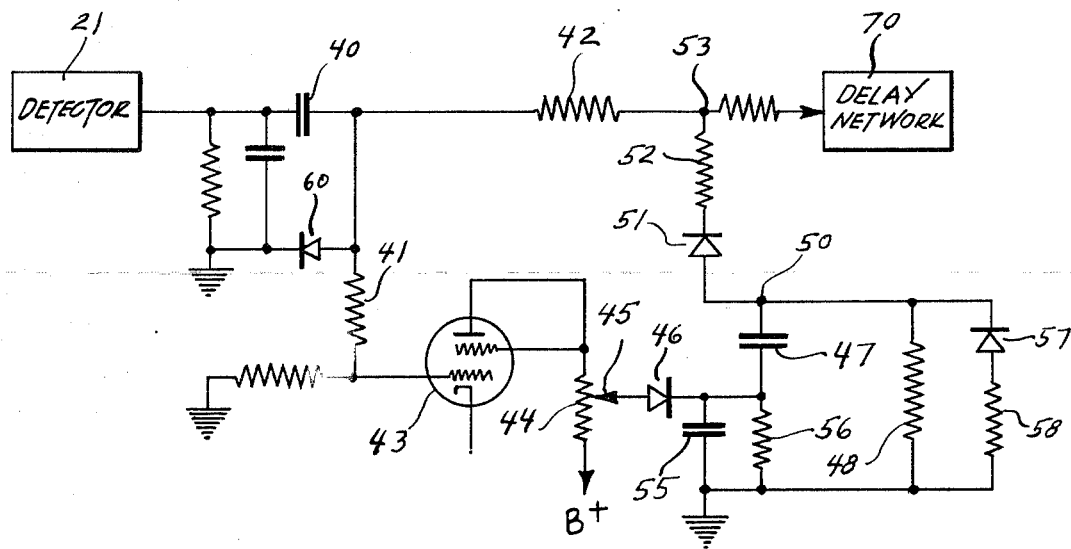
FIG. 2 is a schematic diagram of a portion of the system of FIG. 1, showing my unique means for eliminating objectionable transients.

Elimination of the troublesome initial portion of the noise is effected by a transient eliminator circuit 32 (FIG. 1). Although any suitable means may be employed for this purpose, my invention includes a unique circuit for effecting such transient noise elimination. Referring to FIG. 2, the output of the detector 21 is applied through a capacitor 40 to respective resistors 41, 42, one resistor 41 being coupled to the input of an amplitude and phase inverter 43. The inverter 43, which is biased normally with small plate current flow, is provided with an adjustable gain control means, illustrated by a potentiometer 44.

The sliding contact 45 of the potentiometer 44 is coupled through a diode 46 to an RC differentiator network comprising a capacitor 47 and resistor 48 connected between the diode 46 and ground. The junction 50 of the capacitor 47 and resistor 48 is coupled to the resistor 42 through a diode 51 and a resistor 52.

The circuit of my invention is adapted to provide, at the junction 53 of the resistors 42, 52, a voltage that is of opposite polarity to that from the detector 21. Such inverted voltage is also made sufficiently large, and of sufficient duration, to cancel the objectionable portion of the noise voltage 28 from the detector 21.

To establish the desired cancellation, I provide a capacitor 55 between the diode 46 and ground, a resistor 56 shunting the capacitor 55, and a series-connected diode 57 and a resistor 58 shunting the resistor 48. With this circuit arrangement, the capacitor 55 charges through the diode 46, such diode 46 permitting the capacitor 55 to hold the charge long enough to insure the existence of a cancellation voltage, via the operation of the differentiator network 47, 48, of sufficient duration to cancel the initial part of the undesired noise voltage 28. The resistor 56 serves as a bleed-off for the holding capacitor 55, and the resistor 58 and the diode 57 function to keep a continuing signal from recharging the capacitor 47.

My circuit also includes means to permit only voltages of predetermined polarity from the detector to be processed for cancellation. For example, a forward diode 60 is connected between the capacitor 40 and ground, thereby to prevent positive voltages from reaching the inverter 43, in which case the detector 21 is arranged to develop the negatives of the voltages shown in FIG. 4c.

It is apparent, of course, that the circuit of FIG. 2 also eliminates the first portion of each of the detected voltages 26 and 27 that are obtained from the bottom reflection and the echo. However, the remaining portions of these voltages, illustrated at 26', 27' in FIG. 4d, are of sufficient duration so they are utilized for the desired purposes.

As with the filter 13, the output of the filter 14 is amplified and detected, through an amplifier 61 and a detector 62. FIG. 4f illustrates the low frequency ($f_4$) voltages 65, 66 corresponding to the low frequency bottom reflection and the low frequency echo. FIG. 4g shows the corresponding detected voltages 67, 68. As will be noted, the voltages 67, 68 are opposite in polarity to the voltages 26', 27'. For a detector 62 that rectifies the positive portions of the voltages 65, 66 the negative polarity voltages 67, 68 are obtained through the use of an inverter 69.

In my invention, I cancel the high and low frequency components of the bottom reflection and echo voltages. One arrangement is to subtract the voltage 67 of FIG. 4g from the voltage 26', i.e., algebraic addition. However, before this can be done, the signal voltage 26' of the higher frequency $f_1$ must be delayed. This is because the filter 14 for the low frequency signal $f_4$ causes the voltage 65 to build up gradually. This results in the voltage 26' from the transient eliminator 32 being displaced relative to the voltage 67. To correct this, the voltage 26' is applied through a delay network 70. Referring to FIG. 4g, this re-establishes the desired coincidence relationship.

Initially, the gains of the amplifiers 11, 12 are set so that the low frequency signal $f_4$ from the filter 14 is slightly greater in magnitude than the higher frequency signal $f_1$ from the filter 13. In this connection, either the main bang or the bottom reflection can be used for setting the gain.

With the gains of the amplifiers 11, 12 set as described, the voltages 26', 67 are summed and detected to cancel all but the echo voltage 27'. This is done by way of a summing network that includes a pair of resistors 72, 73 connected between the delay network 70 and the inverter 69, and by detectors 79, 80 coupled to the junction 74 of the resistors 72, 73, as through tuned circuits 77, 78. The net voltage (see FIG. 4h) appearing at the outputs of the detectors 79, 80 is the echo voltage 27'. The voltage 28' is, by virtue of the reduction in duration and magnitude of the voltage 28, of insufficient duration or magnitude to excite the tuned circuits, and thus does not apepar in such outputs.

The duration of the echo voltage 27' is determinative of the aspect of the object. That is, the object is oriented broadside to the transducer 10 for echo voltages of shortest duration, and it is oriented directly along a line away from the transducer for echo voltages of greatest duration. Such echo voltages vary in duration because all parts of an object illuminated by the sound waves are regenerative. Thus, sound waves returning from parts of an object, that are at different distances from the transducer arrive in a train, the "length" of which train corresponds to the angle of the object between the extremes of broadside and "end-on," i.e., bow-stern or stern-bow.

To obtain indications of beam and bow-stern positions, wave shape detecting means are coupled to the junction 74 for operating a beam indicator 75 only in the presence of short echo voltages, and for operating a bow-stern indicator 76 only in the presence of long echo voltages. To this end, I connect each of the two tuned circuits 77, 78 to the junction 74. The tuned circuits 77, 78 are tuned to the respective basic frequencies of the shortest and longest echo voltages, as referenced to the duration of the echo voltages, i.e., the demodulated envelopes thereof. When either of such voltages is present, it is detected to provide a trigger pulse for the associated indicator. As shown, the detectors 79, 80 are coupled to the tuned circuits for establishing such trigger pulses.

As will be apparent, the trigger pulses from the detectors 79, 80 are of different duration. The pulse of short duration appears only in the output of the detector 79 and operates the beam indicator 75 through an amplifier 81 and trigger circuit 82. Similarly, long trigger pulses only are developed by the detector 80, and are utilized to operate the bow-stern indicator 76 through an amplifier 83 and a trigger circuit 84.

From the foregoing, it will be apparent that similar provisions are embraced by this invention for developing trigger pulses of different duration, corresponding to positions of the object other than broadside and end-on. An additional advantage of the wave shape detection scheme of my invention is that if there is any residual transient noise voltage 28' it does not get through the tuned circuit 77.

The outputs of the detectors 79, 80 are also utilized to operate a range indicator 85. These outputs are coupled through respective amplifiers 86, 87 to a trigger circuit 88 for the range indicator. This indicator is also coupled to the transducer through an amplifier 89 and detector network 90. The indicator measures the time between the main long voltage applied through the detector 90, and the echo voltage applied to the trigger 88.

While I have illustrated and described one embodiment of my invention, it will be apparent that various modifications may be made without departing from the spirit and the scope of my invention. Typically an amplitude gain control means may be employed which increases the sensitivity with time proportional to the loss of echo strength. A differential gain set which makes the high and low frequency channels equal may be employed, and the initial charge can be used to establish the proper ratio. In certain situations, due to water absorption, the frequency spectrum response may be lowered as time increases. In shallow water, where high frequencies are lost, the frequency of both channels may be lowered, as to frequencies $f_2$ and $f_3$, in which case suitable filters 100, 101 may be connected as through switches 102, 103, to the amplifiers 20 and 61. Accordingly, I do not intend that my invention shall not be limited, except as by the appended claims.

I claim:

1. Apparatus for detecting an object of predetermined size in a vicinity in which objects of different size are present, comprising: means to generate a complex energy wave having a plurality of frequency components to be reflected by the various objects, each object being characterized in that its size determines the frequency components for the major portions of the reflected energy therefrom; transducer means for developing voltages from the reflected frequency components; selecting means coupled to said transducer means for selecting different frequency components of said voltages, the higher of such frequency components including the major portion of the reflected energy from an object of the predetermined size and a portion of the reflected energy from the other object, the lower frequency components including a significant portion of the energy from such other object; and means to combine the selected voltages to develop a resultant voltage representing only the higher frequency components reflected from the object of predetermined size.

2. An underwater sound detecting system for locating an object of predetermined size comprising: means to generate simultaneously sound waves having a plurality of frequency components to be reflected from different objects in the water, each object being one wherein its size determines the frequency distribution of the sound waves reflected therefrom; hydrophone transducer means for receiving the reflected sound waves and developing voltages of different frequencies therefrom; filter means coupled to said transducer means for selecting different frequency components of said voltages, the higher of such frequency components including the major portion of the sound waves reflected from an object of the predetermined size and a portion of the sound waves reflected from the other object, the lower frequency components including a significant portion of the sound waves reflected from such other object; and means to combine the selected voltages to develop a resultant voltage representing only the higher frequency components in the sound waves reflected from the object of predetermined size.

3. The combination defined in claim 2, further including respective means for detecting the voltages from said filter means; means for relatively shifting said detected voltages to establish time coincidence of the peak values thereof; and means for subtracting said detected voltages.

4. The combination defined in claim 3, wherein said subtracting means includes means for inverting one detected voltage relative to the other; and summing means for combining said detected voltages.

5. The combination defined in claim 3, further including means for removing the initial portion of each detected waveform of the higher frequency components.

6. The combination defined in claim 2, further including means operable in response to the resultant voltage to provide an indication of the duration thereof, the duration of such resultant voltage corresponding to the attitude of the object of predetermined size.

7. The combination defined in claim 2, further including means operable in response to the resultant voltage to provide an indication of the duration thereof, the duration of such resultant voltage corresponding to the attitude of the object of predetermined size, and means coupled to said transducer means and to said last-named means to establish an observable indication of the range of the predetermined object relative to said transducer means.

8. The combination defined in claim 2, further including means responsive to the resultant voltage for indicating automatically the attitude of such object.

References Cited

UNITED STATES PATENTS

| | | | |
|---|---|---|---|
| 1,698,857 | 1/1929 | Schmidt et al. | 340—3 |
| 2,473,469 | 6/1949 | Dahm | 181—.53 |
| 2,718,638 | 9/1955 | De Rosa et al. | 343—100.7 |
| 2,817,081 | 12/1957 | Roberts | 343—1.5 |
| 2,825,900 | 3/1958 | Collbohm | 343—100.12 |
| 2,884,627 | 4/1959 | Ratcliffe. | |
| 2,896,204 | 7/1959 | Gille | 343—112 |
| 2,932,547 | 4/1960 | Swan | 181—.53 |
| 2,938,206 | 5/1960 | Davis et al. | 343—100.12 |
| 2,944,620 | 7/1960 | Van Dijck | 181—.56 |
| 1,504,247 | 8/1924 | Jacques | 340—6 |
| 2,402,391 | 6/1946 | Goddard | 340—3 |
| 2,757,357 | 7/1956 | Peterson | 181—.53 |

FOREIGN PATENTS

| | | |
|---|---|---|
| 816,119 | 7/1959 | Great Britain. |
| 1,037,328 | 8/1958 | Germany. |

OTHER REFERENCES

Geophysics, vol. 17, No. 4, October 1952, pp. 721–738 relied on.

RICHARD A. FARLEY, Primary Examiner